(12) United States Patent
Hsieh et al.

(10) Patent No.: US 11,703,701 B2
(45) Date of Patent: Jul. 18, 2023

(54) DISPLAY DEVICE

(71) Applicant: InnoLux Corporation, Miao-Li County (TW)

(72) Inventors: Hong-Sheng Hsieh, Miao-Li County (TW); Hao-Yu Chen, Miao-Li County (TW); Cheng-Jen Chu, Miao-Li County (TW); Jyun-Sian Li, Miao-Li County (TW); Chu-Hong Lai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/336,421

(22) Filed: Jun. 2, 2021

(65) Prior Publication Data
US 2022/0011608 A1    Jan. 13, 2022

Related U.S. Application Data

(60) Provisional application No. 63/050,123, filed on Jul. 10, 2020.

(30) Foreign Application Priority Data

Apr. 9, 2021   (CN) .......................... 202110382002.1

(51) Int. Cl.
*G02F 1/13*     (2006.01)
*G02F 1/1339*   (2006.01)
*G02F 1/1335*   (2006.01)

(52) U.S. Cl.
CPC ........ *G02F 1/1323* (2013.01); *G02F 1/13394* (2013.01); *G02F 1/13398* (2021.01); *G02F 1/133512* (2013.01)

(58) Field of Classification Search
CPC ............ G02F 1/13394; G02F 1/13398; G02F 1/1323; G02F 1/133302; G02F 1/133305; G02F 1/133512; G02F 2201/56; H04N 2013/40; H04N 2013/403; H04N 2013/405; B60K 2370/195; G02B 6/0046
See application file for complete search history.

(56) References Cited

U.S. PATENT DOCUMENTS

| | | | | |
|---|---|---|---|---|
| 2011/0299002 A1* | 12/2011 | Won | .................. | G02F 1/133512 349/43 |
| 2015/0293393 A1* | 10/2015 | Kim | ..................... | G02F 1/13394 349/155 |
| 2017/0219867 A1* | 8/2017 | Guo | .................. | G02F 1/133512 |
| 2019/0025628 A1* | 1/2019 | Moon | ................. | H01L 27/1218 |
| 2019/0033632 A1* | 1/2019 | Lee | ........................... | G09G 3/36 |
| 2021/0231859 A1* | 7/2021 | Wang | .................... | G02B 6/0046 |

FOREIGN PATENT DOCUMENTS

KR          10-1255309 B1     4/2013

* cited by examiner

*Primary Examiner* — Angela K Davison
(74) *Attorney, Agent, or Firm* — McClure, Qualey & Rodack, LLP

(57) ABSTRACT

A display device is provided. The display device includes a display panel and a visible angle adjustment panel. The visible angle adjustment panel has a liquid-crystal layer. The liquid-crystal layer has a plurality of cell gaps, wherein the thicknesses of the cell gaps are different from each other, and the thicknesses of the cell gaps gradually increase along a direction.

15 Claims, 5 Drawing Sheets

DISPLAY DEVICE

CROSS REFERENCE TO RELATED APPLICATIONS

This application claims the benefit of U.S. Provisional Application No. 63/050,123, filed Jul. 10, 2020, and claims priority of China Patent Application No. 202110382002.1, filed on Apr. 9, 2021, the entirety of which are incorporated by reference herein.

BACKGROUND

Field of the Disclosure

The present disclosure relates to a display device, and in particular to a display device including a liquid-crystal layer having a plurality of cell gaps, wherein the thicknesses of the cell gaps are different from each other.

Description of the Related Art

Display devices are commonly used in various electronic devices or mobile devices. Currently, some display devices can have the effect of adjusting the visible angle, reducing the angle at which the screen (displayed by the display device) can be seen by others, thereby helping to protect the privacy of the user. However, existing display devices are capable of achieving a satisfactory anti-spy effect only for a specific area of the display device at a specific visible angle, so that the overall anti-spy effect of the display device is not uniform, and fails to meet the privacy needs of users. Therefore, finding a way to solve the above problem has become an important issue.

BRIEF SUMMARY

Some embodiments of the disclosure provide a display device, including a display panel and a visible angle adjustment panel. The visible angle adjustment panel has a liquid-crystal layer. The liquid-crystal layer has a plurality of cell gaps, wherein the thicknesses of the cell gaps are different from each other, and the thicknesses of the cell gaps gradually increase along a direction.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

Figure 1:
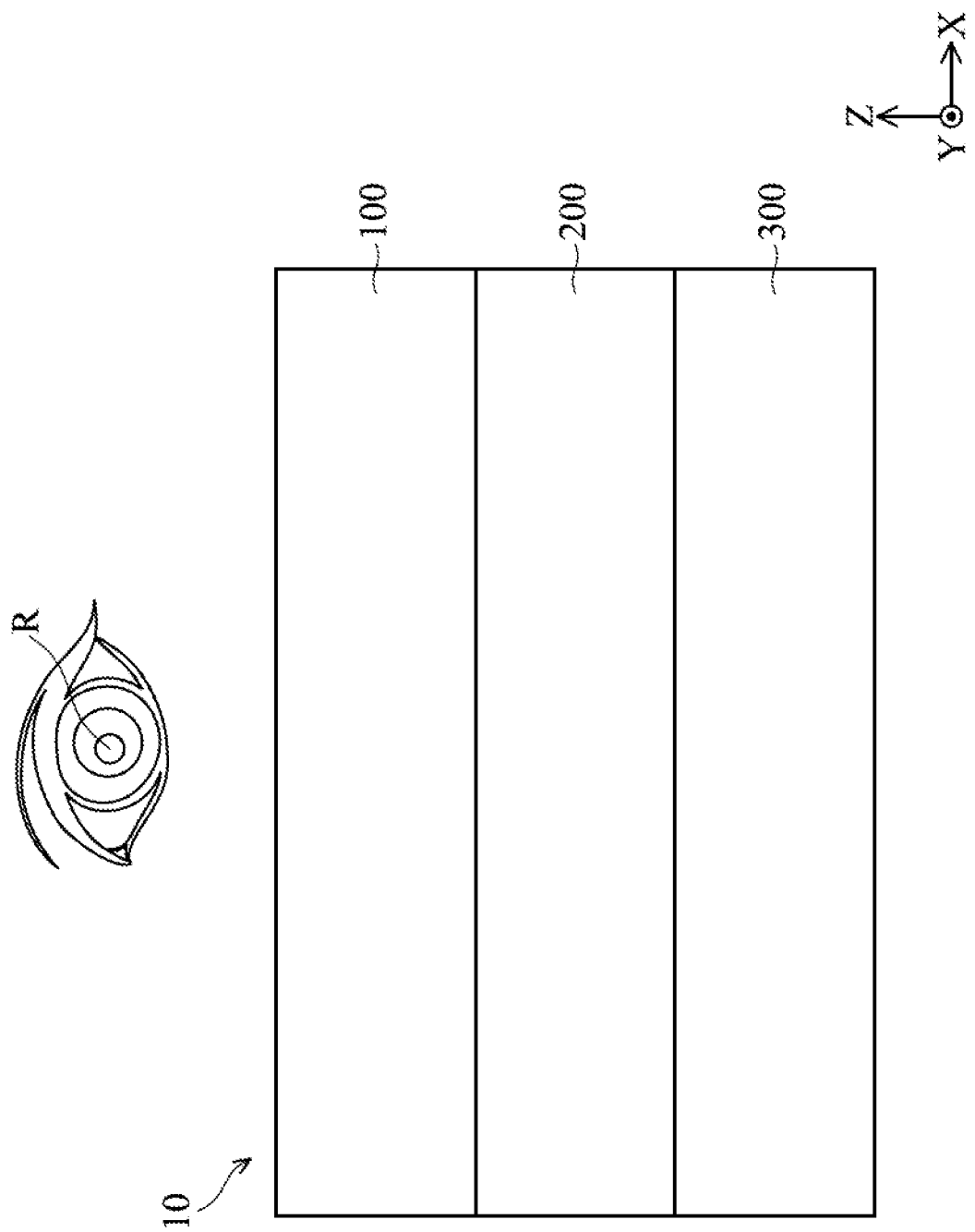
FIG. 1 is a cross-sectional view illustrating a display device in accordance with some embodiments of the present disclosure.

The present disclosure may be understood by referring to the following description and the appended drawings. It should be noted that, for the sake of the simplicity of the drawings and comprehensibility for readers, only a portion of the light-emitting unit is illustrated in multiple figures in the present disclosure, and the specific components in the figures are not drawn to scale. In addition, the number and size of each component in the drawings merely serve as an example, and are not intended to limit the scope of the present disclosure. Furthermore, similar and/or corresponding numerals may be used in different embodiments for describing some embodiments simply and clearly, but they do not represent any relationship between different embodiments and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open-ended words, so they should be interpreted as meaning "including but not limited to . . . ." Therefore, when the terms "including", "comprising", and/or "having" are used in the description of the disclosure, the presence of corresponding features, regions, steps, operations and/or components is specified without excluding the presence of one or more other features, regions, steps, operations and/or components.

In addition, in this specification, relative expressions may be used. For example, "lower", "bottom", "higher" or "top" are used to describe the position of one element relative to another. It should be noted that if a device is flipped upside down, an element that is "lower" will become an element that is "higher".

When a corresponding component (i.e. a film layer or region) is referred to as "on another component", it may be directly on another component, or there may be other components in between. On the other hand, when a component is referred "directly on another component", there is no component between the former two. In addition, when a component is referred "on another component", the two components have an up-down relationship in the top view, and this component can be above or below the other component, and this up-down relationship depends on the orientation of the device.

The terms "about," "equal to," "equivalent," "the same as," "essentially," or "substantially" are generally interpreted as within 20% of a given value or range, or as interpreted as within 10%, 5%, 3%, 2%, 1%, or 0.5% of a given value or range.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. If the first value is equal to the second value, the deviation between the first value and the second value may be within about 10%. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one having ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

FIG. 1 is a top view illustrating a display device 10 in accordance with some embodiments of the present disclosure. In some embodiments, the display device 10 may include, for example, liquid-crystal (LC), light-emitting diode (LED), quantum dot (QD), fluorescence, phosphor, other suitable material, or a combination thereof, but it is not limited thereto. The term LED may be understood to include organic LED (OLED), mini LED, micro LED or quantum dot LED (QLED or QDLED), other suitable material or any combination thereof, but the present disclosure is not limited thereto.

As shown in FIG. 1, the display device 10 may include a display panel 100, a visible angle adjustment panel 200, and/or a backlight module 300. In some embodiments, the visible angle adjustment panel 200 may adjust the visible angle range of the display device 10. The detailed structure of the visible angle adjustment panel 200 will be discussed below in accompany with subsequent drawings. In some embodiments, when the display panel 100 in the display device 10 is a non-self-luminous display panel, the display device 10 includes a backlight module 300. When viewed by a user R, the display panel 100, the visible angle adjustment panel 200, and the backlight module 300 may be stacked in sequence. That is, the visible angle adjustment panel 200 is disposed between the backlight module 300 and the display panel 100, but the preset disclosure is not limited thereto. The backlight module 300 may emit light from a light source (not shown) in the normal direction of the display device 10 (for example, toward the user R, the Z direction). In other words, the light may pass through the visible angle adjustment panel 200 and the display panel 100 in sequence, and may be observed by the user R. In some embodiments, the display panel 100 may also be disposed between the backlight module 300 and the visible angle adjustment panel 200. In other words, the light may pass through the display panel 100 and the visible angle adjustment panel 200 in sequence, and may be observed by the user R, but the present disclosure is not limited thereto.

In addition, in some embodiments, the display device 10 may include a plurality of visible angle adjustment panels 200 to further adjust the range of the visible angle of the display device 10. It should be understood that the display panel 100 and the visible angle adjustment panel 200 may be arranged in any suitable manner. For example, in some embodiments, one visible angle adjustment panel 200 may be located between the display panel 100 and another visible angle adjustment panel 200. In some embodiments, the display panel 100 may be located between different visible angle adjustment panels 200. In some embodiments, a polarizer is disposed on the opposite surfaces of each of the display panel 100 and the visible angle adjustment panel 200, respectively. In some embodiments, single polarizer may be disposed between a surface of the display panel 100 and an adjacent surface of the visible angle adjustment panel 200. By sharing the same polarizer, the assembly process of the display device 10 may be simplified, or the manufacturing cost may be reduced.

It should be noted that although only the display panel 100, the visible angle adjustment panel 200, and the backlight module 300 are shown in this embodiment, those skilled in the art may add other layers and/or elements, and adjust the order of the layers and/or elements. For example, the backlight module 300 may include a light-emitting element, a light guide plate, a diffusion film and/or a brightness enhancement film (not shown in the figures), but the present disclosure is not limited thereto. In addition, the display device 10 may also include a light control film, which is disposed between the display panel 100 and the visible angle adjustment panel 200, or between the backlight module 300 and the display panel 100, or between the backlight module 300 and the visible angle adjustment panel 200. Accordingly, the range of the visible angle of the display device 10 may be further adjusted, but the present disclosure is not limited thereto. In some embodiments, the material of the light guide plate includes poly(methyl methacrylate) (PMMA), polycarbonate (PC), polystyrene (PS) or any other suitable material, but the present disclosure is not limited thereto. The light guide plate may be configured to guide the light emitted by the light emitting element to an appropriate direction (for example, the display direction of the display device 10, such as the Z direction). In some embodiments, the material of the diffusion film includes polyethylene terephthalate (PET), PMMA, silicon dioxide ($SiO_2$) or any other suitable materials, but the present disclosure is not limited thereto. The diffusion film may be configured to diffuse the light to achieve a more uniform display. In some embodiments, the material of the brightness enhancement film includes polyethylene terephthalate, polycarbonate, ultraviolet (UV) curing resin or any other suitable material, but the present disclosure is not limited thereto. The brightness enhancement film may be configured to guide the light to an appropriate angle (for example, direct the light toward the Z direction) to adjust the brightness of the light of the display device 10. In some embodiments, the light control film includes a substrate and a light control element disposed on the substrate. The material of the substrate includes PMMA, polycarbonate, polystyrene or any other suitable material, but the present disclosure is not limited thereto. The light control film may be configured to shield light that is oblique to the Z direction. In some embodiments, the display device 10 may include an anti-reflection layer, which may reduce the reflection caused by external light irradiating the display device 10.

Furthermore, in other embodiments, when the display panel 100 in the display device 10 is a self-luminous display panel, the display device 10 may not include the backlight module 300. In these embodiments, the visible angle adjustment panel 200 is located between the user and the display panel 100 and is closer to the user R than the display panel 100. As such, the visible angle adjustment panel 200 may adjust the range of the visible angle of the display device 10.

Figure 2A:
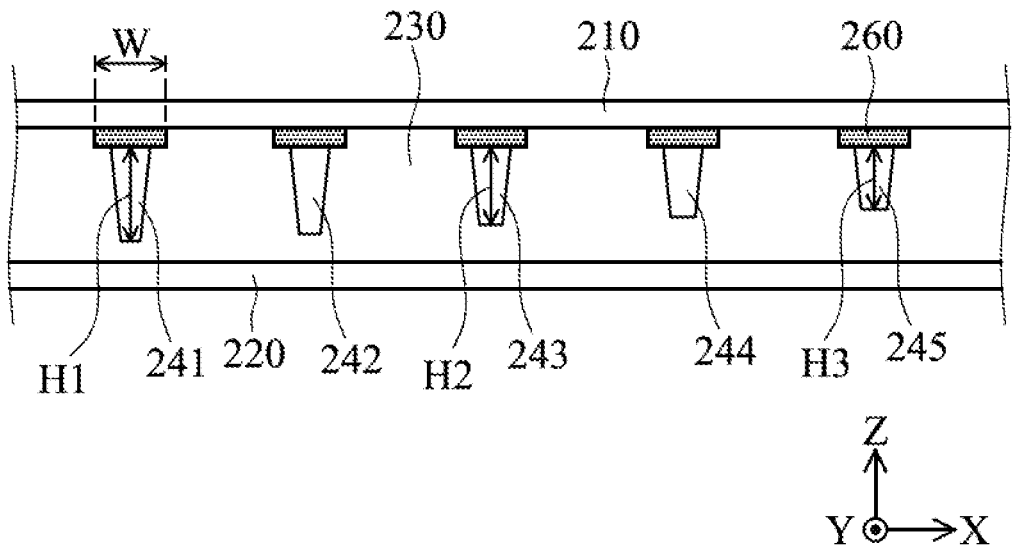
FIGS. 2A and 2B are cross-sectional views illustrating the visible angle adjustment panel in accordance with some embodiments of the present disclosure.
Figure 2B:
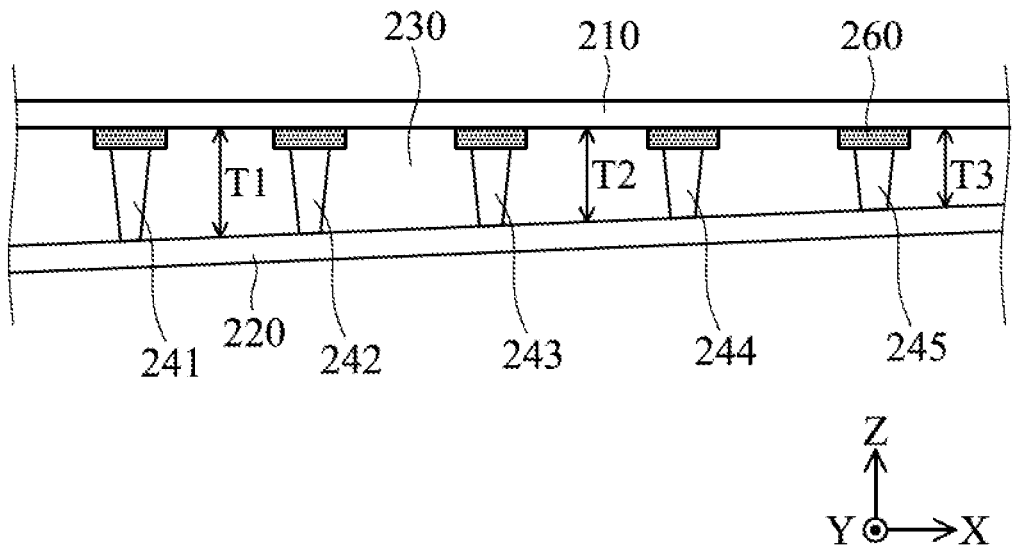

FIGS. 2A and 2B illustrate cross-sectional views of the visible angle adjustment panel 200 in accordance with some embodiments of the present disclosure. It should be noted that FIG. 2A shows a cross-sectional view of the visible angle adjusting panel 200 when it is disassembled, FIG. 2B shows a cross-sectional view of the visible angle adjusting panel 200 after being assembled. FIGS. 2A and 2B may merely include a portion of the visible angle adjusting panel 200. As shown in FIG. 2A, the visible angle adjustment panel 200 includes a substrate 210, a substrate 220, and a liquid-crystal layer 230 located between the substrate 210 and the substrate 220. For example, the substrate 210 and the substrate 220 may be flexible substrates or rigid substrates, wherein the material of the rigid substrate may include, for example, glass, sapphire, or ceramic. The material of the flexible substrate may include, for example, polyimide (PI), polyethylene terephthalate (PET), polycarbonate (PC), polyether oxime (PES), polybutylene terephthalate (PBT), polynaphthalene ethylene glycolate (PEN) or polyarylate (PAR), other suitable materials, or a combination thereof, but the present disclosure is not limited thereto. In some embodiments, the material of the liquid-crystal layer 230 may include, for example, nematic LC, smectic LC, cholesteric LC, blue phase LC, or any suitable liquid-crystal materials, but the present disclosure is not limited thereto. It should be noted that a conductive structure and/or an insulating structure (not shown) may be disposed on the substrate 210 and the substrate 220, respectively, and the conductive structure may transmit electrical signals to control the liquid-crystal layer 230.

In the present embodiment, a plurality of light-shielding members 260 may be disposed on the substrate 210, and corresponding spacers 241, 242, 243, 244, and 245 are respectively disposed on each light-shielding member 260. More specifically, the light-shielding member 260 is disposed between the spacers 241, 242, 243, 244, 245 and the substrate 210. For example, the material of the spacers 241, 242, 243, 244, and 245 may include organic substances (such as resin), other suitable materials, or a combination thereof, but the present disclosure is not limited thereto. Referring to FIG. 2A and FIG. 2B, in some embodiments, the cross-sectional structure of the spacers 241, 242, 243, 244, 245 may be trapezoidal, semicircular, semi-elliptical or other suitable shapes, but the present disclosure is not limited thereto. The material of the light-shielding member 260 may include dark organic substances, such as black resin, other suitable materials, or a combination thereof, but the present disclosure is not limited thereto. In some embodiments, the light-shielding member 260 may also be omitted to simplify the manufacturing process. In some embodiments, in the cross-sectional structure, the light-shielding member 260 may have a maximum width W in a direction (for example, the X direction) that is perpendicular to the normal direction (for example, the Z direction) of the substrate 210. In some embodiments, the maximum width W of each light-shielding member 260 may be greater than the maximum width of the corresponding spacers 241, 242, 243, 244, and 245, wherein the above widths may be measured in a direction that is perpendicular to the Z direction (for example, the X direction) in the cross-sectional structure, but the present disclosure is not limited thereto. In some embodiments, the maximum width W of each light-shielding member 260 may be equal to the maximum width of the corresponding spacers 241, 242, 243, 244, and 245. By setting the maximum width W of each light-shielding member 260 to be greater than or equal to the maximum width of the corresponding spacers 241, 242, 243, 244, 245, the possibility that the user notices the spacers 241, 242, 243, 244, 245 is reduced, which allows users to have a better visual experience.

In some embodiments, the maximum heights of the spacers 241, 242, 243, 244, 245 may be different from each other, wherein the foregoing maximum height may be measured in a direction that is parallel to the normal direction (for example, the Z direction) of the substrate 210, but the present disclosure is not limited thereto. In some embodiments, the maximum height of the spacers 241, 242, 243, 244, 245 gradually increases along a direction (for example, along the X direction). For example, the spacer 241 has a maximum height H1, the spacer 243 has a maximum height H2, and the spacer 245 has a maximum height H3, wherein the maximum height H2 of the spacer 243 is greater than the maximum height H3 of the spacer 245, and the maximum height H1 is greater than the maximum height H2 of the spacer 243.

As shown in FIG. 2B, the cross-sectional structure of the visible angle adjustment panel 200 may be wedge-shaped after assembly. Since the maximum heights of the spacers 241, 242, 243, 244, and 245 are different from each other, the liquid-crystal layer 230 disposed between the substrate 210 and the substrate 220 may have a plurality of cell gaps T1, T2, and T3 which are different from each other. The cell gaps T1, T2, and T3 may be measured along a direction that is parallel to the normal direction of the substrate 210 (for example, the Z direction), but the present disclosure is not limited thereto. For example, the cell gap T1 is measured between the spacer 241 and the spacer 242, the cell gap T2 is measured between the spacer 243 and the spacer 244, and the cell gap T3 is measured on the right side of the spacer 245. For example, the cell gap T1 may be defined as the distance between the substrate 210 and the substrate 220 along the Z direction, for example, the distance measured from the inner surface (not shown) of the substrate 210 to the inner surface (not shown) of the substrate 220 along the Z direction. If there are some other film layers on the substrate 210 and the substrate 220, the cell gap T1 may be the distance measured from the inner surface of the substrate 210 to the inner surface of the substrate 220 along the Z direction minus the thickness of the film layers on the substrate 210 and the substrate 220. The method of measuring the cell gap T2 and the cell gap T3 may be the same as described above, and will not be discussed in detail herein. However, the present disclosure is not limited thereto. In some embodiments, the cell gaps T1, T2, and T3 may gradually increase in one direction (for example, in the X direction), but the present disclosure is not limited thereto. For example, in some embodiments, the aforementioned width, height, and thickness (cell gaps) may be measured using an AxoStep™ apparatus or an OTSUKA device, and will not be discussed in detail below.

By setting the liquid-crystal layer 230 to have a plurality of cell gaps which are different from each other (for example, the above-mentioned cell gaps T1, T2, T3), the range of the visible angle range of the display device 10 may be adjusted, and a better anti-spy effect is achieved. As such, if an observer views the display device 10 from a direction that is oblique to the normal direction (for example, the Z direction) of the display device 10, different areas that shows images of the display device 10 would be darker and less obvious for the observer from the side, and therefore the overall anti-spy effect of the display device 10 would be more uniform. For example, if the display device 10 in the present disclosure is used as a vehicle display and is applied directly in front of the front passenger seat, when the driver views the image from the driver's seat toward the display device 10 in front of the front passenger seat, the image would be darker. Therefore, the probability that the driver is disturbed by the display device 10 may be reduced, so that the safety of driving the vehicle may be improved.

Figure 3A:
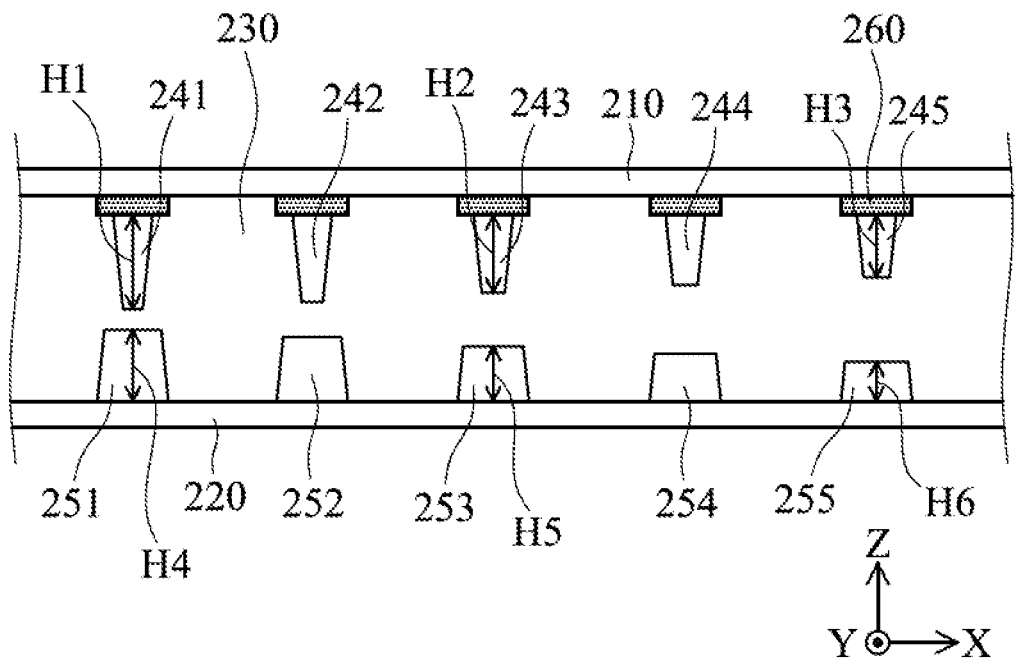
FIGS. 3A and 3B are cross-sectional views illustrating the visible angle adjustment panel in accordance with some embodiments of the present disclosure.
Figure 3B:
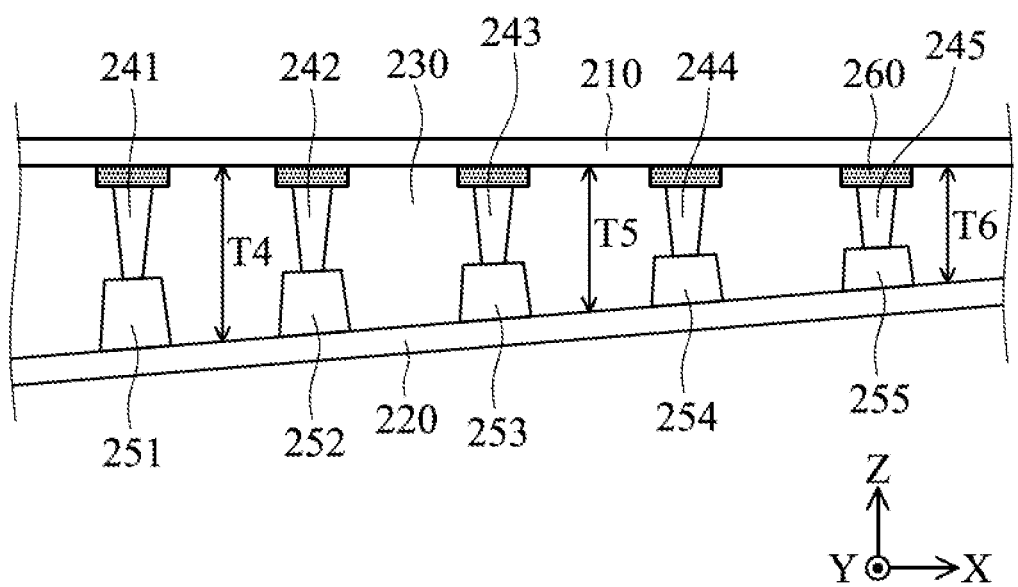

FIGS. 3A and 3B show cross-sectional views illustrating the visible angle adjustment panel 200 in accordance with some embodiments of the present disclosure. It should be noted that the visible angle adjustment panel 200 shown in the present embodiment may include the same or similar portions as the visible angle adjustment panel 200 shown in FIGS. 2A and 2B. These portions will be denoted by the same or similar reference numerals, and will not be discussed in detail hereafter. For example, in the present embodiment, the visible angle adjustment panel 200 includes a substrate 210, a substrate 220, a liquid-crystal layer 230 located between the substrate 210 and the substrate 220, and a light-shielding member 260 and spacers 241, 242, 243, 244, 245 that are disposed on the substrate 210. The difference between the visible angle adjustment panel 200 in the present embodiment and the visible angle adjustment panel 200 shown in FIGS. 2A and 2B is that spacers 251, 252, 253, 254, and 255 may be disposed on the substrate 220, wherein the spacers 251, 252, 253, 254, and 255 are disposed corresponding to the spacers 241, 242, 243, 244, and 245, respectively. In some embodiments, the spacers 251, 252, 253, 254, and 255 at least partially overlap the spacers 241, 242, 243, 244, and 245, respectively.

In some embodiments, the maximum heights of the spacers 251, 252, 253, 254, 255 may be different from each other, wherein the heights of the aforementioned spacers 251, 252, 253, 254, 255 may be measured along a direction that is parallel to the normal direction (for example, Z direction) of the substrate 220, but the present disclosure is not limited thereto. In some embodiments, the maximum height of the spacers 251, 252, 253, 254, 255 gradually increases along a direction (for example, along the X direction). For example, the spacer 251 has a maximum height H4, the spacer 253 has a maximum height H5, and the spacer 255 has a maximum height H6, wherein the maximum height H5 of the spacer 253 is greater than the maximum height H6 of the spacer 255, and the maximum height H4 of the spacer 251 is greater than the maximum height H5 of the spacer 253, but the present disclosure is not limited thereto.

In some embodiments, the maximum heights of the spacers 251, 252, 253, 254, 255 may be substantially the same as each other, but the maximum heights of the spacers 241, 242, 243, 244, 245 may also be substantially different from each other. In some embodiments, the maximum heights of the spacers 251, 252, 253, 254, 255 may be different from each other, but the maximum heights of the spacers 241, 242, 243, 244, 245 may be substantially the same as each other. In some embodiments, the maximum widths of the spacers 251, 252, 253, 254, and 255 may be greater than the maximum widths of the corresponding spacers 241, 242, 243, 244, and 245, respectively. The above widths may be measured in a direction (for example, the X direction) that is perpendicular to the normal direction (for example, the Z direction) of the substrate 210, but the present disclosure is not limited thereto. With the above configuration, the allowable error during assembly of the spacers 251, 252, 253, 254, 255 and the corresponding spacers 241, 242, 243, 244, 245 may be increased, and the yield of assembling the visible angle adjustment panel 200 may be improved. In other embodiments, the maximum widths of the spacers 251, 252, 253, 254, and 255 may be less than or equal to the maximum widths of the corresponding spacers 241, 242, 243, 244, and 245, respectively.

As shown in FIG. 3B, the cross-sectional structure of the visible angle adjustment panel 200 may be wedge-shaped after combined. The combined maximum heights of the spacers 241, 242, 243, 244, 245 and the corresponding spacers 251, 252, 253, 254, 255 will be different from each other. For example, the sum of the maximum heights of the spacer 241 and the spacer 251 is greater than the sum of the maximum heights of the spacer 243 and the spacer 253, and the sum of the maximum heights of the spacer 243 and the spacer 253 is greater than the sum of the maximum height of the spacer 245 and the spacer 255. Therefore, the liquid-crystal layer 230 may have a plurality of cell gaps T4, T5, and T6 which are different from each other, wherein the aforementioned cell gaps T4, T5, T6 may be measured along a direction that is parallel to the normal direction (such as the Z direction) of the substrate 210, but the present disclosure is not limited thereto. For example, the cell gap T4 is measured between the spacer 241 and the spacer 242, the cell gap T5 is measured between the spacer 243 and the spacer 244, and the cell gap T6 is measured on the right side of the spacer 245. The measurement method may be the same as described above, so is will not be repeated hereafter. In some embodiments, the cell gaps T4, T5, and T6 may gradually increase in one direction (for example, in the X direction), but the present disclosure is not limited thereto.

Figure 4A:
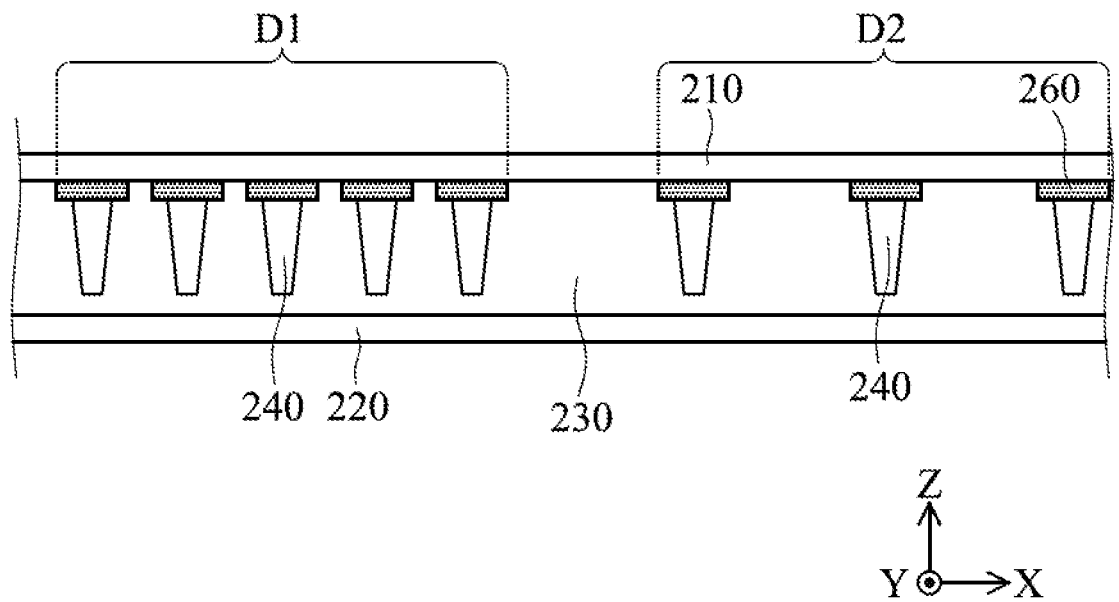
FIGS. 4A and 4B are cross-sectional views illustrating the visible angle adjustment panel in accordance with some embodiments of the present disclosure.
Figure 4B:
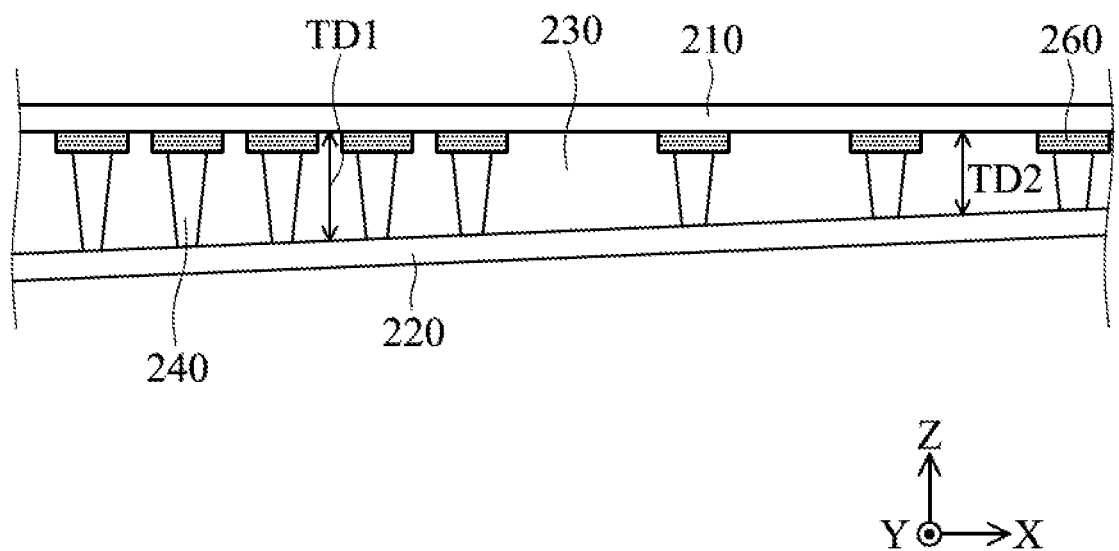

FIGS. 4A and 4B show cross-sectional views of the visible angle adjustment panel in accordance with some embodiments of the present disclosure. It should be noted that the visible angle adjustment panel 200 shown in the present embodiment may include the same or similar portions as the visible angle adjustment panel 200 shown in FIGS. 2A and 2B. These portions will be denoted by the same or similar reference numerals, and will not be discussed in detail hereafter. For example, in the present embodiment, the visible angle adjustment panel 200 includes a substrate 210, a substrate 220, a liquid-crystal layer 230 located between the substrate 210 and the substrate 220, and a light-shielding member 260 and spacers 240 that are disposed on the substrate 210. In some other embodiments, the light-shielding member 260 and the spacer 240 may be disposed on the substrate 220, or the light-shielding member 260 and the spacer 240 may be disposed on the substrate 210 and the substrate 220 at the same time. The difference between the visible angle adjustment panel 200 in the present embodiment and the visible angle adjustment panel 200 shown in FIGS. 2A and 2B is that the maximum heights of the spacers 240 disposed on the substrate 210 are approximately the same as each other, and the spacers 240 in different regions of the substrate 210 have different densities. For example, taking FIG. 4A as an example, the spacers 240 are densely distributed in the left region of the substrate 210 and the distribution density of the spacers 240 is defined as the density D1, and the spacers 240 are dispersedly distributed in the right region of the substrate 210 and the distribution density of the spacers 240 is defined as the density D2. For example, when viewing the substrate 210 along the Z direction (for example, the X-Y plane), the number of spacers 240 may be calculated within a rectangular range of 1 square millimeter (1 mm$^2$) for density comparison. For example, when viewing the substrate 210 along the Z direction (such as the X-Y plane), a rectangular range of 1 square millimeter may also be set to calculate the total bottom area of the spacer 240 for density comparison. However, the present disclosure is not limited thereto, and different calculation methods may be adopted according to design or manufacturing requirements.

As shown in FIG. 4B, the cross-sectional structure of the visible angle adjustment panel 200 may be wedge-shaped after combined. Since the spacers 240 are slightly elastic, the spacers 240 that are densely distributed may provide greater supporting force. Therefore, the liquid-crystal layer 230 may have a plurality of cell gaps TD1 and TD2 that are different from each other, wherein the aforementioned cell gaps TD1 and TD2 may be measured along a direction that is parallel to the normal direction (such as the Z direction) of the substrate 210, but the present disclosure is not limited thereto. For example, the cell gap TD1 is the cell gap in the region where the density D1 is measured, and the cell gap TD2 is the cell gap in the region where the density D2 is measured. The measurement method may be the same as described above, and will not be repeated hereafter. In some embodiments, the cell gaps TD1 and TD2 may gradually increase in one direction (for example, leftward in the X direction), but the present disclosure is not limited thereto.

Figure 5:
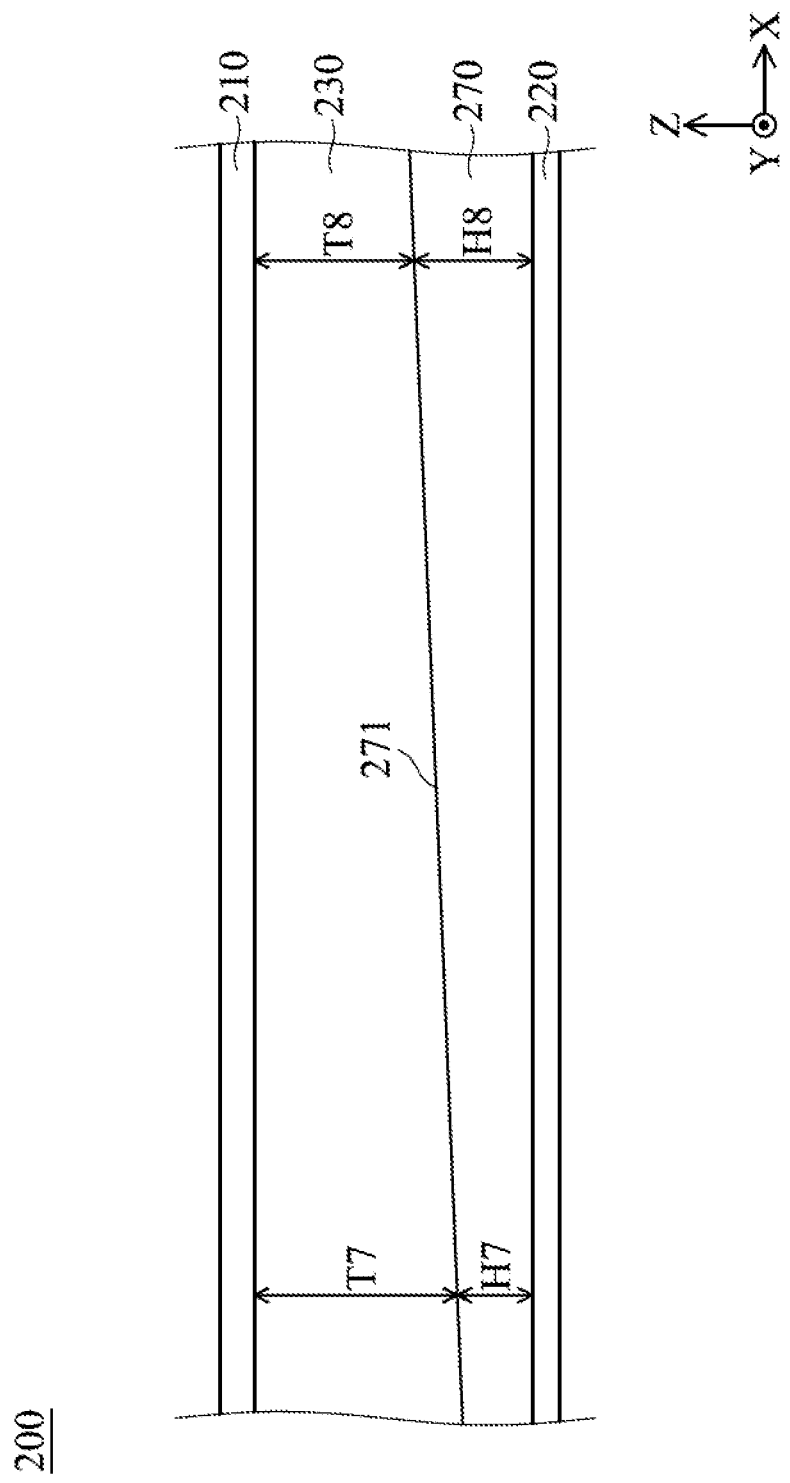
FIG. 5 is a cross-sectional view illustrating the visible angle adjustment panel in accordance with some embodiments of the present disclosure.

FIG. 5 shows a cross-sectional view illustrating the visible angle adjustment panel 200 in accordance with some embodiments of the present disclosure. It should be noted that the visible angle adjustment panel 200 shown in this embodiment may include the same or similar portions as the visible angle adjustment panel 200 shown in FIGS. 2A and 2B. These portions will be denoted by the same or similar reference numerals, and will not be discussed in detail hereafter. For example, in this embodiment, the visible angle adjustment panel 200 includes a substrate 210, a substrate 220, and a liquid-crystal layer 230 located between the substrate 210 and the substrate 220. The difference between the visible angle adjustment panel 200 in this embodiment and the visible angle adjustment panel 200 shown in FIGS. 2A and 2B is that an adjustment layer 270 is disposed on the substrate 220. For example, the adjustment layer 270 may include a transparent material, but the present disclosure is not limited thereto. In the cross-sectional view shown in the present embodiment, the upper surface 271 of the adjustment layer 270 may be inclined relative to the upper surface of the substrate 220 (that is, for example, parallel to the X-Y plane). Therefore, the adjustment layer 270 may have different heights (for example, the height H7 and the height H8) at different positions along the X direction, wherein the aforementioned height may be measured from the upper surface of the substrate 220 to the upper surface 271 of the adjustment layer 270 along the direction that is parallel to the normal direction (for example, the Z direction) of the substrate 210. However, the present disclosure is not limited thereto. In some embodiments, the height of the adjustment layer 270 gradually increases along one direction (for example, along the X direction). For example, the height H8 of the adjustment layer 270 on the right side is greater than the height H7 of the adjustment layer 270 on the left side, but the present disclosure is not limited thereto.

As shown in FIG. 5, the cross-sectional structure of the visible angle adjustment panel 200 may be rectangular after combined. Since the adjustment layer 270 may have different heights H7 and H8, the liquid-crystal layer 230 therefore has a plurality of cell gaps T7 and T8 that are different from each other, wherein the aforementioned cell gaps T7 and T8 may be measured along a direction that is parallel to the normal direction (for example, in the Z direction) of the substrate 210, the measurement method may be the same as described above, which will not be repeated hereafter, but the present disclosure is not limited thereto. For example, the sum of the height H7 of the adjustment layer 270 and the cell gap T7 of the liquid-crystal layer 230 may be substantially equal to the sum of the height H8 of the adjustment layer 270 and the cell gap T8 of the liquid-crystal layer 230. In some embodiments, the cell gaps T7 and T8 may gradually increase in one direction (for example, along the X direction), that is, the cell gaps T7 and T8 may gradually increase in the direction (for example, along the X direction) in which the height of the adjustment layer 270 gradually decreases, but the present disclosure is not limited thereto. In addition, in some embodiments, spacers having different heights (for example, spacers 241, 242, 243, 244, and 245 shown in FIG. 2) may be disposed on the substrate 210. As such, it may help to adjust the cell gaps T7 and T8 of the liquid-crystal layer 230, or it may help to keep the visible angle adjustment panel 200 to have a rectangular cross-sectional structure.

As set forth above, the embodiments of the present disclosure provide a display device including a liquid-crystal layer in which the cell gaps gradually increase in one direction. By setting the liquid-crystal layer to have a plurality of cell gaps that are different from each other, each portion of the display device may correspond to a specific visible angle to achieve a better anti-spy effect. AS such, if the observer views the display device from a display direction that is inclined to the display device, the anti-spy effect for the observer will be more uniform throughout the display device.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:
1. A display device, comprising:
 a display panel; and
 a visible angle adjustment panel, wherein the visible angle adjustment panel has a liquid-crystal layer, the liquid-crystal layer has a plurality of cell gaps, the thicknesses of the cell gaps are different from each other, and the thicknesses of the cell gaps gradually increase along a direction, wherein the visible angle adjustment panel comprises two substrates, a plurality of spacers are disposed on one of the substrates, and the maximum heights of the spacers gradually increase along the direction, and wherein another plurality of spacers are disposed on the other of the substrates, and a maximum width of each of the spacers disposed on the one of the substrates is different from a maximum width of each of the spacers disposed on the other of the substrates.

2. The display device as claimed in claim 1, wherein the visible angle adjustment panel is disposed over the display panel.

3. The display device as claimed in claim 1, further comprising a backlight module, wherein the visible angle adjustment panel is disposed between the backlight module and the display panel.

4. The display device as claimed in claim 1, further comprising a backlight module, wherein the display panel is disposed between the backlight module and the visible angle adjustment panel.

5. The display device as claimed in claim 1, wherein a cross-section of the visible angle adjustment panel is a wedge.

6. The display device as claimed in claim 1, wherein the maximum heights of the spacers on the other of the substrates gradually increase along the direction.

7. The display device as claimed in claim 1, wherein a cross-sectional structure of the spacers is trapezoidal, semicircular, or semi-elliptical.

8. The display device as claimed in claim 1, wherein the spacers are tapered from the one of the substrates to the other of the substrates.

9. The display device as claimed in claim 1, wherein the spacers comprise organic substances.

10. The display device as claimed in claim 1, wherein the visible angle adjustment panel further comprises a plurality of light-shielding members, and each of the light-shielding members is disposed between one of the spacers and the one of the substrates.

11. The display device as claimed in claim 10, wherein a maximum width of each of the light-shielding members is greater than or equal to a maximum width of each of the spacers.

12. The display device as claimed in claim 1, wherein the visible angle adjustment panel comprises two substrates, a plurality of spacers are disposed on at least one of the two substrates, and a density of the spacers varies along the direction.

13. The display device as claimed in claim 12, wherein the density of the spacers gradually increases along the direction.

14. The display device as claimed in claim 12, wherein the spacers are elastic.

15. A display device, comprising:
 a display panel; and
 a visible angle adjustment panel, wherein the visible angle adjustment panel has a liquid-crystal layer, the liquid-crystal layer has a plurality of cell gaps, the thicknesses of the cell gaps are different from each other, and the thicknesses of the cell gaps gradually increase along a direction,
wherein the visible angle adjustment panel comprises two substrates, a plurality of spacers are disposed on one of the substrates, and the maximum heights of the spacers gradually increase along the direction, and
wherein a plurality of spacers are disposed on the other of the substrates, and the spacers disposed on the one of the substrates partially overlap the spacers disposed on the other of the substrates.

* * * * *